3,081,320
METHOD OF PURIFYING PHOSPHATIDES
Gilbert Elenbogen, Skokie, Ill., assignor to Baxter Laboratories, Inc., Morton Grove, Ill., a corporation of Delaware
No Drawing. Filed Nov. 8, 1960, Ser. No. 67,913
7 Claims. (Cl. 260—403)

The present invention relates to emulsifying agents in general, and more particularly to a novel process of preparing a superior phosphatide emulsifying agent and to the product thus obtained.

Commercial phosphatides, such as soya lecithin, although they have a long history of use as emulsifying agents in the food industry, have had only limited success as emulsifying agents for parenteral products (e.g. fat emulsions). Emulsions prepared with commercial phosphatides, such as soya lecithin, cause a vasodepressor effect when administered and possess very limited emulsion stability.

Various methods have recently been devised for removing the vasodepressor causing agents from the commercial phosphatide emulsifiers, e.g. treating the commercial emulsifiers with resins and adsorbents as described in U.S. Patent Nos. 2,931,818 and 2,945,869, respectively. Such methods, however, possess the disadvantages of being either time consuming, and/or relatively expensive and furthermore, generally unsuccessful in improving the emulsifying ability of the phosphatide emulsifiers.

It is therefore an object of the present invention to disclose a novel, fast, inexpensive, method for removing the vasodepressor causing agents present in phosphatide emulsifiers.

Further it is an object to disclose a method of preparing a superior emulsifier, devoid of vasodepressor substances, which possesses superior emulsifying properties compared to those of commercial phosphatide preparations.

These and still other objects will become more apparent as the specification proceeds.

It has now been discovered that a superior emulsifying agent, devoid of vasodepressor effect, may be obtained by adding to a solution containing the alcohol-soluble fraction of commercial soya phosphatides calcium ions to form an insoluble salt with the phosphatidic acid fraction.

In the preferred practice of the present invention an alcohol solution containing 1 part of an alcohol-soluble fraction of soya phosphatides (generally obtained by extracting commercial soya lecithin with several volumes of a lower aliphatic alcohol e.g. methanol, ethanol, propanol, isopropyl, butanol and the like and removing the solvent), is treated with 1 to 20 parts of $Ca(OH)_2$, $Ca(OAC)_2$ and the like, to form an insoluble salt with the phosphatidic acid fraction. The mixture is filtered and the filtrate concentrated to near dryness and washed with acetone. The phosphatide fraction thus obtained is devoid of vasodepressor effects and possesses superior emulsifying ability.

The practice of the present invention is further illustrated by reference to the following examples in which all "percentages" are expressed as percentages by weight unless otherwise specified.

Example I 10 g. of a commercially available alcohol-soluble fraction of soya phosphatide (Centrophil by Central Soya Inc.) was dissolved in 100 ml. of absolute ethanol. To the solution was added 1.5 g. of calcium hydroxide. The resulting mixture was stirred for 30 minutes and filtered. The resulting filtrate was dried and washed with acetone. The phosphatide fraction thus obtained had the following analysis:

| | Percent |
|---|---|
| Choline | 11.1 |
| Ethanolamine | 1.5 |
| Nitrogen | 1.6 |
| Phosphorus | 3.5 |

To determine if the vasodepressing effects had been removed 1 cc. of an 0.8% solution of the above phosphatide fraction was injected into a mature cat as rapidly as possible. No depressor response was exhibited. In contrast, the injection of 1 cc. of an 0.8% solution of the untreated alcohol-soluble fraction caused a drop of 100 mm. Hg.

Fat emulsions containing 10% Triolein and either 0.8% of an untreated alcohol-soluble fraction of soya lecithin or 0.8% of the emulsifier purified according to the process of Example I were prepared.

Particle size counts were determined by observing a volume of 0.02 mm.$^3$ in each of three samples in a Petroff-Haussec counting chamber. The particles between 5–10 microns in size were counted. All the emulsions were initially satisfactory, i.e. none contained more than 5 particles greater than 5 microns nor any particles greater than 10 microns in the volume observed.

The emulsions were stored at 44° C. and observed at various periods of time. The emulsions prepared with the untreated alcohol-soluble phosphatide emulsifier "oiled" i.e. a layer of oil separated) between 5 to 7 weeks. In contrast, the emulsions prepared using an alcohol-soluble phosphatide fraction treated in accord with the present invention did not contain any particles greater than 5 microns in the volume observed after 6 weeks and only 3 particles between 5–10 microns in the volume observed after 10 weeks with no "oiling" at the end of this period.

Example II

The above experiment was repeated using 20 g. of $Ca(OH)_2$ in place of the 1.5 gm. of calcium hydroxide. The analysis of the product thus obtained was as follows:

| | Percent |
|---|---|
| Choline | 11.0 |
| Ethanolamine | 1.5 |
| Nitrogen | 1.6 |
| Phosphorus | 3.5 |

Example III

The procedure of Example I was repeated employing 10 g. of the alcohol-soluble phosphatide fraction obtained by extracting 1 kg. of commercial soya lecithin (Glidden Soya Lecithin granules) with several volumes of absolute ethanol in place of the commercially available alcohol-soluble phosphatide fraction. The results obtained were identical with that of Example I.

Example IV

The procedure of Example I was repeated employing methanol as a solvent in place of the ethanol. The phosphatide fraction obtained after treatment was likewise devoid of vasodepressor activity and suitable for parenteral fat emulsion use.

Example V

The procedure of Example I was repeated employing isopropanol as a solvent in place of the ethanol. The phosphatide fraction obtained after treatment was likewise devoid of vasodepressor activity and suitable for parenteral emulsion use.

While for purposes of illustration, the examples have been quite specific, it will be apparent that the scope of the invention is not so restricted.

In addition to the specific compounds named in the examples other calcium compounds capable of forming insoluble salts with the phosphatidic acid fractions may be used.

Other solvents than those specified in the examples in which the salt formed is insoluble may, of course, also be used but apparently possess no advantage over the use of the lower alcohols (i.e. 1–4 C atoms). Generally the solvent preferred is absolute ethanol, although the process is likewise effective in the presence of an amount of water insufficient to precipitate the phosphatides.

It will be readily apparent from the above examples that the exercise of the present invention results in a superior phosphatide emulsifier of uniform composition practically irregardless of the amount of basic substance added. The uniformity of composition obtained by exercise of the present invention is one example vividly illustrating the difference between this process and processes using adsorbent materials in which the amount of adsorbent used must be carefully controlled to obtain a uniform product. A further disadvantage to prior art methods is that in addition to removing the vasodepressor substances the adsorbent treatments substantially reduce or remove the desirable phosphatidyl ethanolamine fraction.

It is significant to note that the practice of the present invention results in a phosphatide emulsifier in which the percentages of the superior emulsifying compounds, namely phosphatidyl choline and phosphatidyl ethanolamine are extremely high, e.g. from about 9 to about 11% of choline and from about 1.3 to about 1.6% of ethanolamine. It is the high percentages of the above-mentioned compounds which are believed to result in the superior emulsifying action of the novel emulsifier of the present invention.

The embodiments of the invention in which an exclusive property or privilege is claimed are as follows:

1. The method of preparing a superior phosphatide emulsifying agent especially suited for use in parenteral preparations which comprises preparing a solution containing the alcohol-soluble fraction of commercial lecithin adding to said solution a water soluble basic calcium compound to form an insoluble calcium salt with the phosphatidic acid fraction of said alcohol soluble fraction of commercial lecithin, removing said insoluble salt and then treating said solution to isolate a superior phosphatide emulsifying agent.

2. The method of claim 1 in which the water soluble basic calcium compound is calcium hydroxide.

3. The method of claim 2 in which the water soluble basic calcium compound is calcium acetate.

4. The method of preparing a superior phosphatide emulsifier especially suited for use in parenteral preparations which comprises preparing a solution containing the alcohol-soluble fraction of commercial lecithin, treating said solution with a water soluble basic calcium compound to form an insoluble calcium salt with only the phosphatidic acid fraction of said alcohol-soluble fraction removing said insoluble salt, and then isolating the remaining soluble phosphatide fractions from said solution.

5. The method of claim 4 in which the water soluble basic calcium compound is calcium hydroxide.

6. The method of claim 4 in which the water soluble basic calcium compound is calcium acetate.

7. A superior emulsifying agent comprising from about 9 to 11% choline and from about 1.3 to about 1.6% of ethanolamine and prepared by the method which comprises treating a solution of the alcohol-soluble fraction of commercial lecithin with a water soluble basic calcium compound to form insoluble calcium salts with the phosphatidic acid fraction, removing said insoluble salts and then isolating the remaining phosphatides which constitute the superior emulsifying agent.

References Cited in the file of this patent

UNITED STATES PATENTS 1,555,517    Posternak _____ Sept. 29, 1925

OTHER REFERENCES

Wittcoff: The Phosphatides, pages 149 and 161 (1951 edition), A.C.S. Monograph No. 112, Reinhold Pub. Co., New York, N.Y.

UNITED STATES PATENT OFFICE
CERTIFICATE OF CORRECTION

Patent No. 3,081,320     Gilbert Elenbogen     March 12, 1963

It is hereby certified that error appears in the above numbered patent requiring correction and that the said Letters Patent should read as corrected below.

Column 1, line 67, and column 2, line 50, for "10 g.", each occurrence, read -- 1.0 g. --.

Signed and sealed this 26th day of October 1965.

(SEAL)
Attest:

ERNEST W. SWIDER
Attesting Officer

EDWARD J. BRENNER
Commissioner of Patents